United States Patent [19]

Schendel

[11] Patent Number: 5,086,644
[45] Date of Patent: Feb. 11, 1992

[54] ULTRA SENSITIVE LEAK DETECTION

[75] Inventor: Robert E. Schendel, Kingwood, Tex.

[73] Assignee: Environmental Protection Technology, Inc., Kingwood, Tex.

[21] Appl. No.: 607,820

[22] Filed: Nov. 1, 1990

[51] Int. Cl.⁵ ............................................. G01M 3/26
[52] U.S. Cl. ................................................. 73/49.2
[58] Field of Search .............. 73/49.2, 299, 298, 297, 73/861

[56] References Cited

U.S. PATENT DOCUMENTS

| | | | |
|---|---|---|---|
| 4,856,343 | 8/1989 | Hon | 73/861 |
| 4,862,734 | 9/1989 | Elderton | 73/49.2 |
| 4,893,498 | 1/1990 | Jensen | 73/49.2 |

FOREIGN PATENT DOCUMENTS 263530  10/1989  Japan .................................. 73/49.2

Primary Examiner—Tom Noland
Assistant Examiner—Joseph W. Roskos
Attorney, Agent, or Firm—Parks and Assoc.

[57] ABSTRACT

An apparatus for measuring very small flows into and out of large tanks comprising a reference vessel substantially vertical and proximate the tank to be metered and connected in fluid communication with the tank and having transducers located between the connection point and the surface of the fluid in the reference vessel for converting the mass of fluid flow there through to an electrical signal readable into equivalent volume change in the main tank and a meter for reading the electrical signal.

11 Claims, 2 Drawing Sheets

ULTRA SENSITIVE LEAK DETECTION

BACKGROUND OF INVENTION

This present invention is especially designed to measure ultra small leaks in large capacity liquid tanks. This invention is designed to measure very small leaks from very large capacity tanks such as the ability to measure one (1) gallon out of a total inventory of a two million gallon tank. This is especially important in the area of detecting the leaking of storage tanks.

The most common technique used by the prior art to measure product level is a float which rides on the surface of the product. However, this approach is susceptible to a multitude of mechanical problems which limits its use as an ultra high accuracy sensor. In general, the prior art float type transducers associated with floats are limited in the range of 0.007 inches of movement before they can give a reading or, about fifty (50) gallons of change in large tanks before they read.

Other techniques used for level sensing, such as deferential pressures or interfaced detections, can offer slightly better accuracy under specific circumstances, but these are also not accurate enough to meet the proposed requirements set by environmental agencies.

There have been many examples of prior art which have tried to solve this problem but generally the accuracy of these leak detecting meters are no greater than fifty (50) gallons in two million and such leakage is unacceptable in terms of the current environmental standards.

Much of the prior art attempted to utilize pressure changes caused by the movement of the fluid in some kind of a tube to activate a diaphragm upon the change of fluid flow or level. While this may be reasonably accurate under very controlled conditions, in the normal conditions of a storage tank, it is not successful. The reason it is not successful is because in normal storage tanks you have extreme conditions of temperature and various vapor levels for various products which could have a significant impact on the accuracy of the meter. Further, attempting to read vapor pressure and changes in the pressure above based on the movement of the liquid below provides for additional inaccuracies as the vapor is more compressible and more subject to error because of its compressibility than is measuring the fluids motion itself.

OBJECT OF THE INVENTION

It is the object of this invention to provide an improved apparatus for detecting very small leaks in large storage tanks.

It is further an object of this invention to measure the movement of the fluid in both a single direction or a bidirectional flow indicating leakage in, or out of the tank.

It is a further object of this invention to provide a meter which is capable of measuring the consequences of a product level change rather than the actual fluid level change in the vessel.

At least one of the objects of this invention is to provide a meter which is capable of being installed externally of the tank to provide easy replacement and monitoring without taking the tank being measured off line.

The object of this invention is to provide a meter which can read any size tank simply by adjusting the reference to size in order to generate the required minimum flow.

Yet another object is to measure leaks into or out of a tank.

It is thus the object of this invention to provide a meter for measuring ultra small leaks or flows either in or out of a relatively large capacity liquid storage tank utilizing the measurement of flow between the reference vessel and the tank as the liquid moves to equalize the level to reach hydrostatic leveling between the surfaces of the liquid between the reference tube and the tank to be measured.

It is another object of this invention to provide a meter which can be outside the environment of the liquid such that corrosion will not be a factor in affecting the accuracy of the meter as used.

Other objects and features of this invention will be apparent by reference to the following specifications and to the drawings.

FIG. 1 is a schematic diagram of the apparatus embodying the present inventions.

FIG. 2 is a representational drawing of the connection between the reference vessel and the tank.

FIG. 3 is a view of the heating element and the mass heat readers associated with this meter.

FIG. 4 is a schematic diagram of the operation of the sensing portion of the meter of this invention.

BRIEF DESCRIPTION OF THE DRAWINGS

The apparatus of this invention is shown in general in FIG. 1. The tank 10 has connected to it the apparatus of this invention at any compatible valve 11 or point on tank 10 which is at any point below the fluid level in the tank 10 to be measured. The apparatus further includes a reference vessel 12 which is located proximate to tank 10 to be measured and is positioned substantially vertical to the tank 10 to be measured. A connection 13 is provided between the valve 11 of the tank and the lower end 14 of the reference vessel 12. The connection 13 is in fluid communication with the reference vessel 12 and the fluid in the tank 10 upon the opening of the valve 11.

It should be understood that the connection between the reference vessel 12 and the valve 11 of the tank 10 would allow free flow of the fluid from the reference vessel 12 to the tank 10 and from the tank 10 to the reference vessel 12. The upper end 15 of the reference vessel is connected through the valve 16 to the tank 10 by tank valve 17. Once valve 16 and 17 are open and the valve 11 is open, there is a free equilibrium to establish the common hydrostatic head between the fluids in the reference vessel and the fluids in the tank 10.

Figure 1:
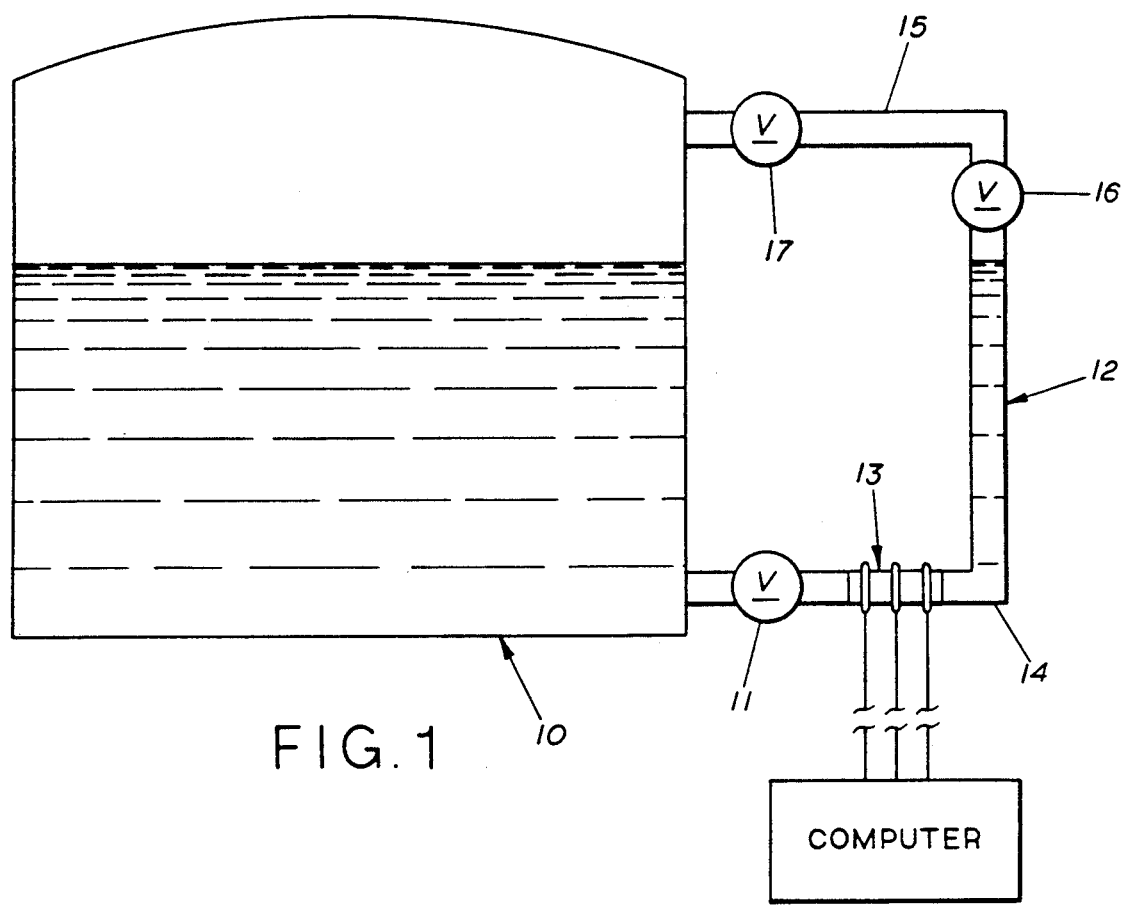

Thus, upon the occasion of fluids being added to the tank 10, increased flow would occur through the connection 13 into the reference vessel 12. Also, upon loss of fluid from tank 10, there would be a passing of fluid from the reference vessel 12 through the connector 13 into the tank 10 in order to establish a hydrostatic equilibrium for the levels of the fluids. Also with the values 17 and 16 open their is no hinderance to the flow by pressures being unequal in the tank 10 or the upper end 15 of reference vessel 12.

The connector 13 should be provided with a constant or known cross sectional area to assist in the reading of the amount of fluid that is flowing through connector 13. Mounted about the connector 13 or located within connector 13 depending on the desired engineering effect is a heater element 18 for the elevation of the temperature of the fluid in the region of the heating element 18. Located a known distance in the line of the connector 13 is also located at least one heat transducer 20 for reading the temperature of the fluid in the tube. So long as the fluid remains motionless then that is indicative of no fluid being moved between reference vessel 12 to tank 10. However, upon the loss of fluid from the tank 10, there is immediately set in force the need for the liquid to find its equilibrium between the reference vessel 12 and the tank 10. As the molecules of the liquid are moved from the reference vessel 12 to the tank 10 a flow of those molecules through the connector 13 occurs which passes the heating element 18 and causes a migration of heated liquid to pass by the heat transducer 20. The quantity of heat is determined by the heat transducer 20 and it is correlated into a given mass based on the cross-section of the connector 13 and then converted to an electrical signal which can be proportionalized to be readable for the equivalent volume change in the main tank 10.

Figure 3:
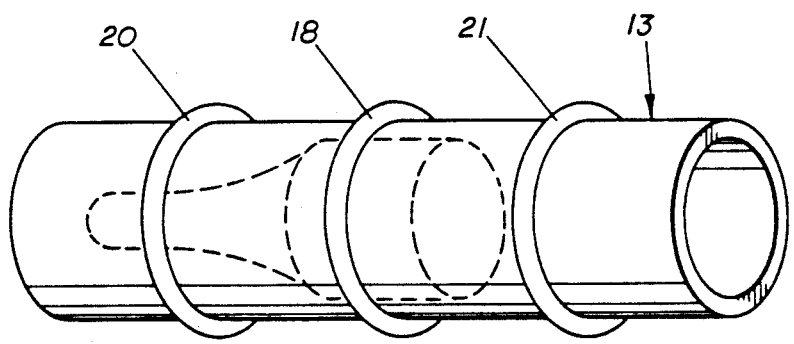

In at least one (1) embodiment a pair of heat transducers 20 and 21 are positioned one on either side of the heater element 18 which is located on the connection 13, as shown in FIG. 3.

In this position of heat transducer 20 and 21, the heating element 18 is located such that as flow occurs into or out of the tank a reading can be had relative to the movement of liquid in either direction in the connector 13 for giving a readout of the amount of fluid that has either been added to or removed from the tank 10.

The ability to interpret this into the volume or rate flow is old in the art and can be achieved by any software program designed to read and proportionalize relative to the configuration of the tank and the cross sectional area of connector 13 and the distance and relative heat input of the heating element 18 and the sensitivity of the heat transducers 20 or 21.

It should be understood that in at least in one embodiment the temperature of the heating element 18 is designed to raise the temperature of the liquid by ten to twenty degrees above the level of ambient. This heat difference is sufficient to allow a heat transducer 20 and 21 to sense the migration of a heated fluid from the heating element to the heat transducer 20, and 21 upon the movement of the fluid in the connection 13.

It would further be understood by those skilled in the art that the rate and the time between the sensing of the fluid and the quantity of the heat being sensed would be indicative of the rate of flow occurring through the connector 13.

Figure 2:
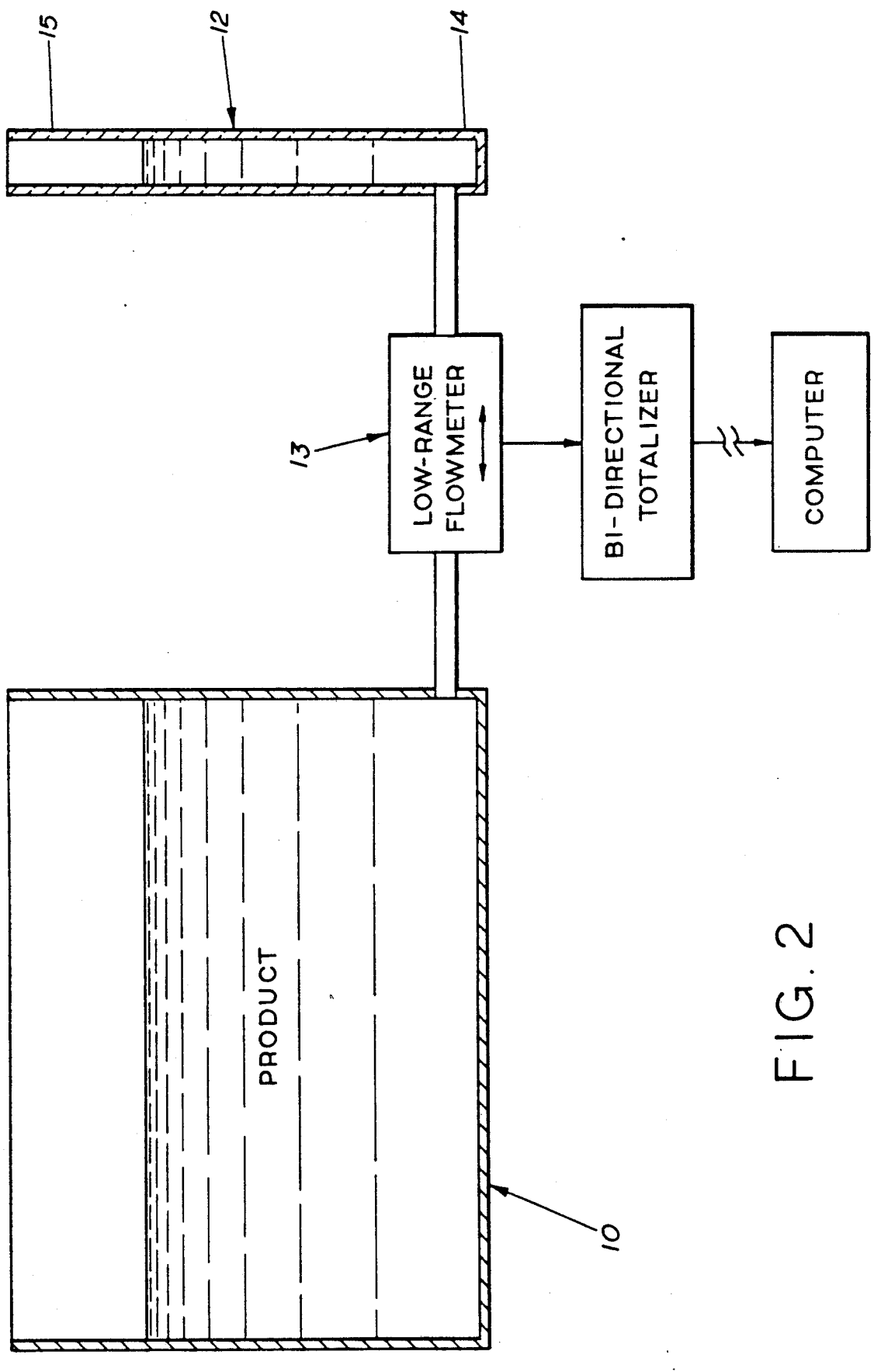

Referring to FIG. 2 which is a schematic diagram it can be seen that the tank 10 has a product or liquid therein and the connector 13 is shown diagrammatically as is also reference vessel 12. It can be seen in FIG. 2 the importance in this case of the reference vessel 12 to be open to atmosphere as that is the same condition which exists in the tank 10 of FIG. 2. It can be seen that the output from the connector 13 low-range flow meter is directed as a signal to a by-directional totalizer which then feeds to the remote computer for reading the flow in the tank.

Figure 4:
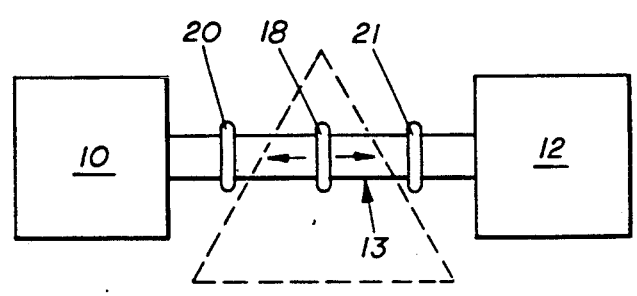

It should be understood from FIG. 2 and FIG. 4 that it is important to allow the product levels or fluids to reach equilibrium unhindered by either atmosphere or vapor pressures in the vessels and that the reference vessel 12 and tank 10 can either be open to atmosphere are closed, but if closed then the head pressure in the reference vessel 12 and the tank 10 should be joined in fluid communication for equalization thereof.

It should be understood that this apparatus may be used in both instantaneous checking of tanks for leaks as well as being used over time to monitor the loss of small amounts of product in very large storage tanks.

Referring now to FIG. 3 which is an expanded view of the heating element 18 and the heat transducer 20 and 21 it can be seen diagrammatically what the relationship between the heating element 18, the connector 13, and the heat transducer 20 and 21 may be. Thus, as the heating element 18 sets up a constant temperature through the liquid, that temperature would stay constant relative to the area of the heating element 18 and only upon movement would cause the heated liquid to flow past the heat transducers 20 and 21 in this case and therefore be sensed as a quantity of heat being passed through the heat transducer 20 and 21 giving an indication of the level of flow of the liquid from the tank or into the tank.

This is further demonstrated in FIG. 4 which shows that any flow of the heated fluid would be sensed by the heat transducer 20 and 21, and then converted into an electrical signal readable into equivalent volume change in the main tank 10.

It should be understood by those skilled in the art that a chiller could be provided to cool the liquid and then the heat transducers would be sensing the change in temperature as a cooled liquid rather than as one heated.

I claim:

1. An apparatus for measuring very small flows into and out of relatively large tanks comprising:
   a. a reference vessel positioned substantially vertical and proximate to said tank for which measurements are to be taken;
   b. a means for connecting said tank in fluid communication with said reference vessel at any point on said tank below the fluid level in said tank to be measured;
   c. a means having a predetermined cross sectional area therethrough connected in fluid communication between said means for connecting said tank in fluid communication with said reference vessel and said reference vessel below the surface of the fluid in said reference vessel for converting the mass of fluid flow therethrough to an electrical signal readable into equivalent volume change in the tank; and
   d. a means for reading said electrical signal for recording and indicating the accrued data.

2. The apparatus of claim 1 wherein said reference vessel is proximate and externally positioned relative to the tank for which measurements are to be taken.

3. The apparatus of claim 2 wherein said means for connecting said tank in fluid communication with said reference vessel is located at any point below the fluid level in the tank to be measured.

4. The apparatus of claim 2 wherein said means for connecting said tank in fluid communication with said reference vessel is a means having a known and constant cross sectional area therethrough for providing a means for determining the mass of flow of the fluid therein.

5. The apparatus of claim 4 further comprising a means connected to said reference vessel and said tank for the head pressure of said reference vessel and said tank to be in fluid communication with each other for the unrestricted equalization of the head pressures between said tank and said reference vessel.

6. The apparatus of claim 5 wherein said means connected in fluid communication between said means of connecting said tank in fluid communication with said reference vessel further comprises a means connected in fluid communication between said reference vessel and below the surface of the fluid in said reference vessel for converting the mass of fluid flow therethrough to an electrical signal readable into equivalent volume change in the tank.

7. The apparatus of claim 6 wherein the means having a predetermined cross sectional area further comprises;
   a. A thermal means for changing the temperature of the liquid proximate said thermal means;
   b. At least one temperature transducer means positioned a known distance from the thermal means to read the quantity of heat and rate of movement of the temperature altered fluid upon any flow in said means; and
   c. An electrical means for reading said quantity of heat and rate of movement into equivalent volume change in the tank.

8. The apparatus of claim 7 wherein said thermal means is located between two temperature transducer means to read the movement of the temperature altered fluid upon any flow in said means in any direction.

9. The apparatus of claim 8 wherein said thermal means is a heater means and the temperature transducer means are heat sensitive.

10. The apparatus of claim 8 wherein said thermal means is a cooler means and the temperature transducer means are heat sensitive.

11. The apparatus of claim 2 wherein said means for connecting said tank in fluid communication with said reference vessel at any point on said tank is a compatible valve at any point on said tank below the fluid level in said tank to be measured.

* * * * *